United States Patent
Callahan

[19]

[11] Patent Number: 6,132,820
[45] Date of Patent: Oct. 17, 2000

[54] SIMULATED ROCK AND METHOD OF MAKING SAME

[76] Inventor: Harvey J. Callahan, 514 S. Edison Rd., Marsing, Id. 83639

[21] Appl. No.: 09/098,386

[22] Filed: Jun. 16, 1998

[51] Int. Cl.$^7$ .............................. B29D 22/00; A01N 1/00
[52] U.S. Cl. ..................... 428/15; 428/35.4; 428/35.7; 428/36.9; 52/309.17; 52/311.1; 52/742.14; 427/307; 427/403; 427/407.1
[58] Field of Search .......................... 428/15, 34.4, 35.7, 428/36.9; 427/307, 403, 407.1; 52/309.17, 311.1, 742.14

[56] References Cited

U.S. PATENT DOCUMENTS

| | | | |
|---|---|---|---|
| 716,371 | 12/1902 | Black et al. | 428/15 |
| 2,450,436 | 10/1948 | McIntire | 18/48 |
| 3,836,619 | 9/1974 | Volent | 428/15 |
| 3,950,477 | 4/1976 | Di Giacomo | 264/226 |
| 4,043,826 | 8/1977 | Hum | 106/90 |
| 4,331,734 | 5/1982 | Stegmeier | 428/43 |
| 4,385,088 | 5/1983 | Baskin | 428/15 |
| 4,721,634 | 1/1988 | McKinnon | 428/15 |
| 4,960,622 | 10/1990 | Jarboe et al. | 428/15 |
| 5,364,672 | 11/1994 | Schultze-Kraft | 428/15 |
| 5,422,391 | 6/1995 | Inoue | 428/147 |
| 5,435,949 | 7/1995 | Hwang | 428/15 |
| 5,443,774 | 8/1995 | Klüh | 264/130 |
| 5,543,185 | 8/1996 | Christensen | 428/15 |
| 5,787,667 | 8/1998 | Sheahan et al. | 428/15 |

OTHER PUBLICATIONS

*Hackh's Chemical Dictionary*, Grant, McGraw–Hill Inc., p. 83, 1969.

*Primary Examiner*—Margaret B. Medley
*Attorney, Agent, or Firm*—Robert L. Shaver; Frank J. Dykas

[57] ABSTRACT

A simulated rock and a method of producing it, using Portland Cement, Bentonite or lime, polystyrene, and water. Ground polystyrene is mixed with cement, Bentonite or lime, and water, to form a settable cement formulation which is poured into removable forms. Reinforcing members are included in the mold, and a lifting hook is provided for later lifting and transporting of the resultant simulated rock. One or more base coats can be applied using a different formula, and a color coat can be applied. The method is use for making landscaping rocks, rock fountains, stone barbecues, light pillars, planters, room dividers, artificial masonry panels, and any structure which uses rocks or masonry.

20 Claims, 2 Drawing Sheets

SIMULATED ROCK AND METHOD OF MAKING SAME

BACKGROUND OF THE INVENTION

1. Technical Field

This invention generally relates to simulated rocks, and more particularly to artificial rocks and dimensional masonry products formed of concrete and ground polystyrene.

2. Background

Rocks are often used in landscaping for aesthetic purposes. Rocks are used to form birdbaths, hollow rock planters of various sizes, artificial waterfalls and even decorative fences and rock gardens. The problem with the use of natural rocks is that they are heavy, of random sizes and shapes, and may have to be transported great distances from their natural source of origin to the place of intended use.

Transportation costs can often exceed the labor costs of quarrying the rock and handling it in the final placement on the landscaped grounds.

Another problem with natural rocks, particularly large ones, is that they are not easily handled. Usually there are no natural handholds or attachment points for lifting and placing them, and as a result large, heavy rocks must be handled with hoists equipped with slings or earth moving equipment. This is difficult, sometimes dangerous, and always time consuming.

Additionally, it is often difficult to use natural rock incorporated into dimensional structures, such as fencing, lamp posts, barbecue holders and even furniture, such as rock tables and benches. In order to use the natural rock in these circumstances, it is often necessary to employ the skills and equipment of a stone cutter.

Accordingly, what is needed is a method of producing an artificial rock which simulates the appearance and texture of a desired natural rock, which can be formed in a mold for any particular desired purpose. It is also an object of the present invention to develop a process by which artificial rocks which can be fabricated, either on site at the landscape grounds, or at a commercial production site relatively near the intended market so as to reduce transportation costs. For example, large granite boulders are very difficult to find at a natural site on Cape Cod.

Another object of the present invention is to provide for artificial rocks and masonry products of accurate and consistent dimensions and forms or shapes. Another object is to provide for artificial rocks which incorporate attachment point devices or receptacles for quick attachment and later removal of pad eyes and other grappling devices.

Yet another object of the invention is to provide for artificial rocks which have pre-formed through holes for placement of water pipes, gas pipes or electrical conduit so that artificial waterfalls and/or electric lights or devices, even gas appliances, can be readily incorporated into the final structure.

Another object is the production of relatively light weight artificial rocks which can be readily moved, transported and positioned on site. A further object is to provide a method of producing artificial rock which utilizes material, such as polystyrene, which would otherwise be a waste product. The final object is to produce an artificial rock which is of consistent quality, both in dimension and desired form and in appearance.

DISCLOSURE OF INVENTION

These objects are achieved by the use of a mold, having a pre-formed shape, and a settable cement formulation whose ingredients are cement, powdered Bentonite or lime, ground polystyrene and water. The preferred ratios of the ingredients are:

| INGREDIENT | QUANTITY |
| --- | --- |
| Cement | 40 to 60 pounds |
| Powdered Bentonite | one-half to two gallons |
| Ground Polystyrene | 20 to 60 gallons |
| Water | An amount sufficient to make the mixture viscous to the point where it is barely pourable and where the settable cement and Bentonite or other sealer will adhere to the ground polystyrene |

A preferred ratio for the mixture is as follows:

| INGREDIENT | QUANTITY |
| --- | --- |
| Cement | 50 pounds |
| Powdered Bentonite | one gallon |
| Ground Polystyrene | 30 gallons |
| Water | 4-1/2 gallons |

Anchor points for pad eyes and other shackles can be pre-installed in the mode prior to pouring the settable cement formulation so as to provide ready, secure anchor points for moving the artificial rock around.

In addition to anchor points, through pipes can be pre-installed in the mold, so as to provide passageways for water or gas pipes and electrical conduit.

Once the artificial rock has set and been removed from the mold, one or more finish coats is applied, which is a settable formulation formed of the following ingredients, according to the following range of ratios:

| INGREDIENT | QUANTITY |
| --- | --- |
| Portland Cement, Type 1 or 2 | One part |
| Washed sand, 30 or 70 mesh, or a combination thereof | Two to four parts |
| Bentonite, lime, or other sealer | One-eighth to one-half part |
| Polymer | One-sixth to two-thirds parts |

A preferred finish coat formulation is as follows:

| INGREDIENT | QUANTITY |
| --- | --- |
| Portland Cement, Type 1 or 2 | One part |
| Washed sand, 30 or 70 mesh, or a combination thereof | Three parts |
| Bentonite, lime, or other sealer | One-quarter part |
| Polymer | One-third part |

If the artificial rock is to be a dimensional piece, such as a lamp post, table or bench, it can be polished or troweled to a smooth surface. Typically a base coat of the above formula using the Bentonite or lime is used to fill holes and to add strength and thickness. If color is to be added to a coat applied over one or more layers of base coat, lime is used and not Bentonite. If it is to be a dimensional piece such as a sign, a base coat is first applied. Then a layer of color such as white is applied by trowel, and then letters or a design are applied to the structure. Base coats and or color coats are then applied to the structure and around the letters. The letters are then removed, leaving the white undercoat showing, with the appearance that the letters were sandblasted into the structure.

BEST MODE FOR CARRYING OUT INVENTION

Figure 1:
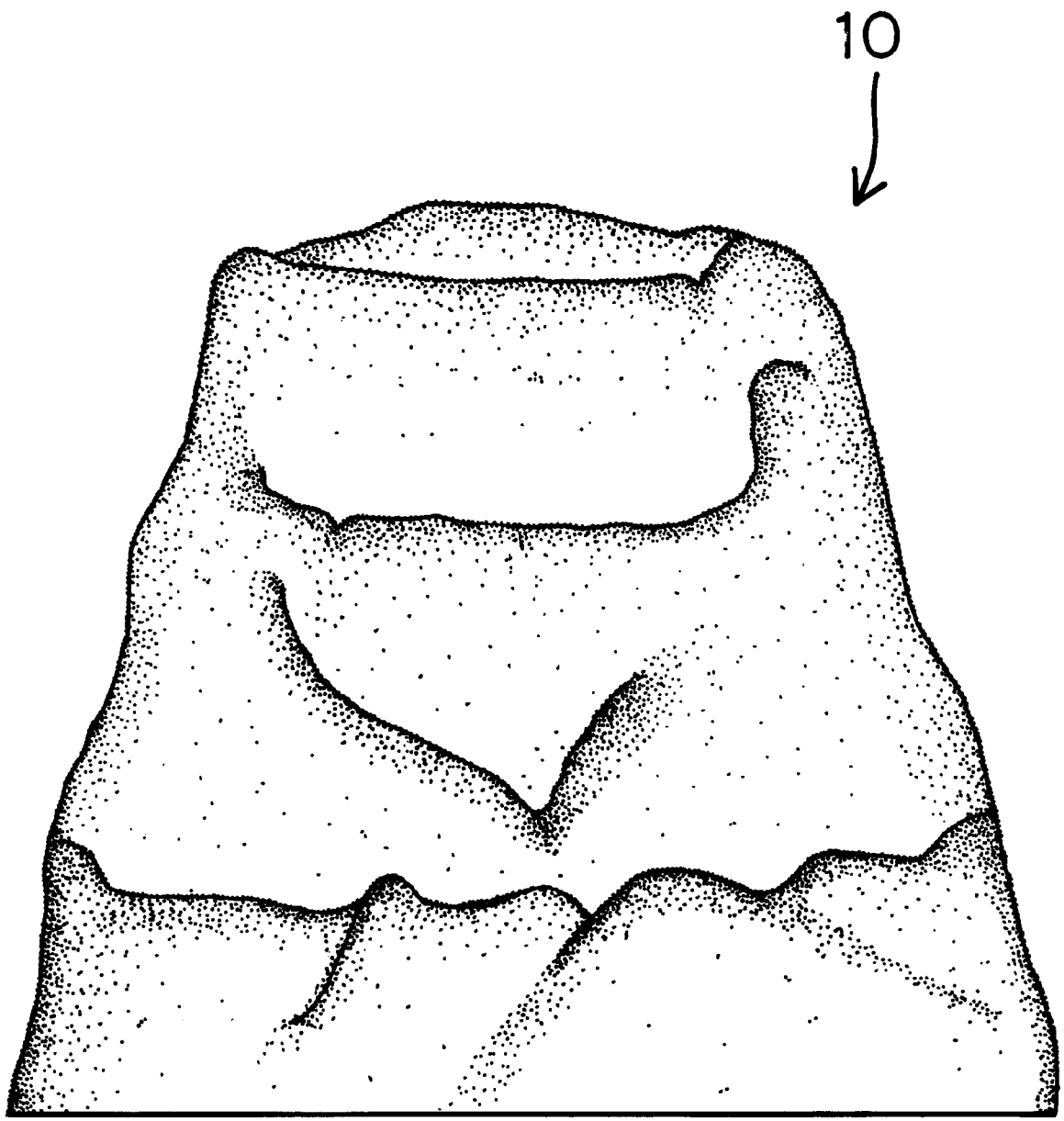
FIG. 1 is a representational plan view of an artificial rock, as produced by the process of this invention.
Figure 2:
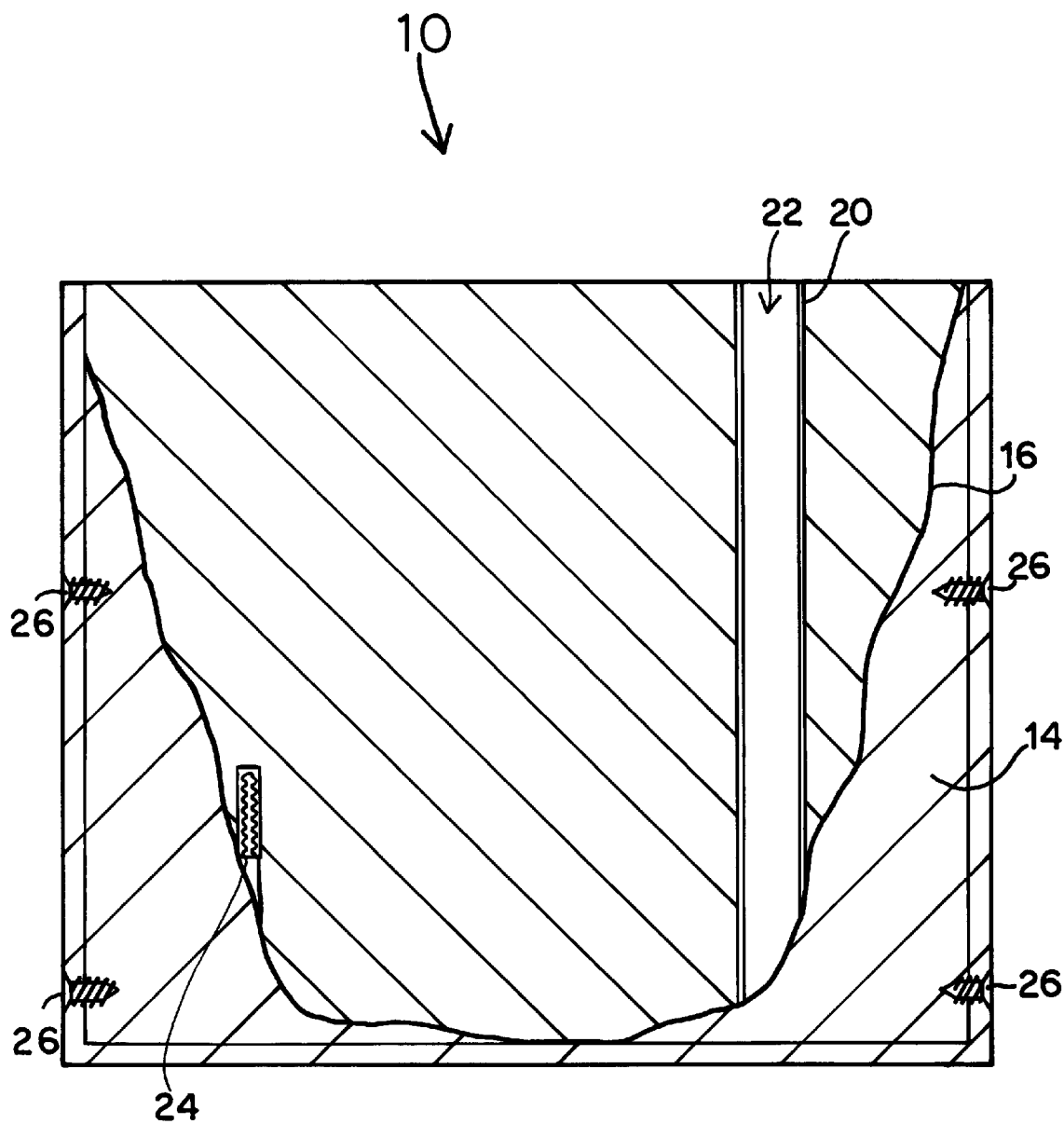
FIG. 2 is a sectional side view of the artificial rock of FIG. 1 as it rests in a mold when being formed.

Artificial rocks of the present invention are formed of a settable mixture of water, Portland cement, Bentonite and ground polystyrene. FIG. 1 shows a representational plan view of one such artificial rock 10. FIG. 2 shows a sectional side view of artificial rock 10 of FIG. 1 in a mold, being formed. The mold is formed of outer box 26 and molding material 14 which is attached to outer mold 12 by some adequate means, which in the preferred embodiment are screws 26. There are two preferred embodiments for molding material 14, one is fabricated of shaped polystyrene, and covered with a plastic material such as visqueen 16, to form a smooth sheeting. In large commercial applications, other materials may be preferred for the mold, for example, plastic or some other material to which the artificial rock will not readily adhere. When the mold is prepared for pouring, in the example of the preferred embodiment shown in FIG. 2, through pipe 20 is installed so as to provide, once the artificial rock 10 has set, through hole 22. The use of through holes 22 are many and varied and include the installation of a water pipe for an artificial water fall, electrical conduit for lighting or even gas lines in the case where the artificial rock is provided with either decorative torches or with a gas barbecue.

At the same time as through pipe 20 is placed, an appropriate number of pad eye receivers 24 are also placed, which, once the artificial rock 10 has been set and removed from the mold, serve as an anchor point for a pad eye or other type of shackle adapted to work with a hoisting system for moving artificial rock 10 around.

Although only one pad eye receiver 24 and through pipe 20 are shown in FIG. 2, it should be readily apparent to those skilled in the art that any number of such devices may be incorporated in the mold to facilitate later handling and adaptive use of artificial rock 10. Additionally, reinforcing steel bar, or "rebar" can be placed in the mold and attached to the pad eye receiver 24. One example of this could be a ring of rebar placed around what will become the base of a structure, with three rebar posts attached to the ring which join and are attached to the pad eye receiver. This arrangement allows a heavy structure to be hoisted from the pad eye receiver.

The settable mixture which is used to form artificial rock 10 is a mixture of cement, powdered Bentonite or other concrete sealer, water and ground polystyrene. The cement and the ground polystyrene are the basic structural ingredients of the mixture. The Bentonite or other concrete sealer is provided to thicken the mixture of settable cement formulation so as to make it more readily adhere to the ground polystyrene. Without the Bentonite or other sealer, liquid, flowable cement has a tendency not to adhere particularly well to the ground polystyrene, and if it is too wet will literally wash through the ground polystyrene and collect at the bottom of the mold.

The preferred ratios for the settable cement formulation are as follows:

| INGREDIENT | QUANTITY |
| --- | --- |
| Cement | 40 to 60 pounds |
| Powdered Bentonite | one-half to two gallons |
| Ground Polystyrene | 20 to 60 gallons |
| Water | An amount sufficient to make the mixture viscous to the point where it is barely pourable and where the settable cement and Bentonite or other sealer will adhere to the ground polystyrene |

A preferred ratio for the mixture is as follows:

| INGREDIENT | QUANTITY |
| --- | --- |
| Cement | 50 pounds |
| Powdered Bentonite | one gallon |
| Ground Polystyrene | 30 gallons |
| Water | 4-1/2 gallons |

Once artificial rock 10 has been formed, the mold is turned over, screws or other fasteners 26 removed, and outer box 12 removed, after which shaped mold 14 and any plastic liner 16 that may be present, are removed from the artificial rock.

After artificial rock 10 has set and been removed from the mold, it can be carved, or cut with a saw, or even scraped down and shaped with a plasterer's scraper. Also, additional artificial rock material can be added to artificial rock 10. However, when this is done, the formula set forth above is modified in that the amount of Bentonite or other sealer is doubled in the mixture, so as to make it sticky enough that it will adhere to the artificial rock 10. In such cases, the added material can be hand molded to any desired shape.

Once the basic shape has been established, a surface coating is applied to cover any exposed polystyrene and to fill any little holes or voids in artificial rock 10. The surface, or finish coat, is a settable formulation formed of the following ingredients, according to the following range of ratios:

| INGREDIENT | QUANTITY |
| --- | --- |
| Portland Cement, Type 1 or 2 | One part |
| Washed sand, 30 or 70 mesh, or a combination thereof | Two to four parts |
| Bentonite, lime, or other sealer | One-eighth to one-half part |
| Polymer | One-sixth to two-thirds parts |

If the rock is to be a natural gray color, then no mortar colors are added to the finish coat, as the Bentonite provides the finish coat with a natural gray color. If it is to remain its natural color, oftentimes the finish coat will be speckled with white cement and may also be speckled with black by adding black powder or mortar color to the cement. Additional colors may be added as necessary. If a color coat is to be added, Bentonite is not used, but lime is used. The basic color tints are commonly available at masonry supply stores as mortar colors.

A preferred ratio for the finish coat mixture is as follows:

| INGREDIENT | QUANTITY |
| --- | --- |
| Portland Cement, Type 1 or 2 | One part |
| Washed sand, 30 or 70 mesh, or a combination thereof | Three parts |
| Bentonite, lime, or other sealer | One-quarter part |
| Polymer | One-third part |

A typical polymer can be purchased from National Starch and Chemical Co. as Product No. 78 6389.

In the event that the artificial rock is to have a color other than gray, then Bentonite, or other sealers, are not added to the finish coat formulation. As a substitute, lime is used.

If the artificial rock is to be a dimensional piece, for example, a sign, it may be lettered by using a stencil, not shown in the drawings, and the application of mortar colors to the finish coat as it is setting. To create letters or a design in an artificial rock structure, the structure is covered with a base coat. White or other color mortar is troweled on. The letters are applied and left stuck to the white mortar. Additional base coat and or color coat is applied to the structure, and around the letters. The letters are then removed, revealing a recessed letter shape with a white or colored surface in the letter. This gives the appearance of a letter which has been sandblasted in rock.

Once the finish coat has dried, a masonry sealer may be applied, either with a brush or a low pressure sprayer.

Different textures to the finish coat can be achieved by varying the method of application of the finish coat. It can be troweled smooth, or textured, or applied with a spray gun to create a rough, natural looking finish, or even polished.

While there is shown and described the present preferred embodiment of the invention, it is to be distinctly understood that this invention is not limited thereto but may be variously embodied to practice within the scope of the following claims.

I claim:

1. A method of producing a simulated rock which comprises:

providing a casting mold conforming to the contour of the generally desired shape for said simulated rock;

mixing a settable cement formulation of cement, powdered Bentonite, water and ground polystyrene;

pouring said settable cement formulation into said mold;

allowing said settable cement formulation to harden and set within said mold; and removing said mold after cement formulation has hardened and set.

2. The method of producing a simulated rock of claim 1 wherein said step of mixing a settable cement formulation further comprises mixing said cement, Bentonite, water and polystyrene in accordance with the ratio of forty to sixty pounds of cement to one half to two gallons of powdered Bentonite to twenty to sixty gallons of ground polystyrene to a sufficient quantity of water to make the settable mixture viscous to the point where it is pourable and will still adhere to the ground polystyrene.

3. The method of producing a simulated rock of claim 2 wherein said step of mixing a settable cement formulation further comprises mixing said cement, Bentonite, water and polystyrene in accordance with the ratio of fifty pounds of cement to one gallon of powdered Bentonite to thirty gallons of ground polystyrene to four and one half gallons of water.

4. The method of producing a simulated rock of claim 1 which further comprises the steps of:

mixing a settable cement finish coat formulation of cement, washed 30 to 70 mesh sand, Bentonite and a polymer; and applying said settable cement finish coat formulation to the outer surface of said simulated rock.

5. The method of producing a simulated rock of claim 4 wherein said step of mixing a settable cement finish coat formulation further comprises mixing said cement, washed 30 to 70 mesh sand, Bentonite, and polymer in accordance with the ratio of one part cement to two to four parts washed 30 to 70 mesh sand to one eighth to one half part Bentonite to one sixth to two thirds part polymer.

6. The method of producing a simulated rock of claim 5 which comprises the further step of troweling said finish coat to form a smooth finish.

7. The method of producing a simulated rock of claim 6 which comprises the further steps of:

applying a stencil having ornamentation or lettering to the setting finish coat; and applying mortar color to the stenciled, setting, finish coat.

8. The method of producing a simulated rock of claim 5 wherein said step of mixing a settable cement finish coat formulation further comprises mixing said cement, washed 30 to 70 mesh sand, Bentonite, and polymer in accordance with the ratio of one part cement to three parts washed 30 to 70 mesh sand to one quarter part Bentonite to one third part Bentonite.

9. The method of producing a simulated rock of claim 1 which further comprises the steps of:

providing said mold with an implement which after said simulated rock is produced will provide said simulated rock with a through hole.

10. The method of producing a simulated rock of claim 1 which further comprises the step of:

providing said mold with a fixed attachment implement which when said simulated rock is produced will provide said simulated rock with an implanted fixed attachment point.

11. A simulated rock piece formed by the process of:

providing a casting mold conforming to the contour of the generally desired shape for said simulated rock piece;

mixing a settable cement formulation of cement, powdered Bentonite, water and ground polystyrene;

pouring said settable cement formulation into said mold;

allowing said settable cement formulation to harden and set within said mold; and removing said mold after cement formulation has hardened and set.

12. The simulated rock piece of claim 11 wherein said step of mixing a settable cement formulation further comprises mixing said cement, Bentonite, water and polystyrene in accordance with the ratio of forty to sixty pounds of cement to one half to two gallons of powdered Bentonite to twenty to sixty gallons of ground polystyrene to a sufficient quantity of water to make the settable mixture viscous to the point where it is pourable and will still adhere to the ground polystyrene.

13. The simulated rock piece of claim 12 wherein said step of mixing a settable cement formulation further comprises mixing said cement, Bentonite, water and polystyrene in accordance with the ratio of fifty pounds of cement to one gallon of powdered Bentonite to thirty gallons of ground polystyrene to four and one half gallons of water.

14. The simulated rock piece of claim 11 wherein said process further comprises the steps of:

mixing a settable cement finish coat formulation of cement, washed 30 to 70 mesh sand, Bentonite and a polymer; and applying said settable cement finish coat formulation to the outer surface of said simulated rock.

15. The simulated rock piece of claim 14 wherein said step of mixing a settable cement finish coat formulation further comprises mixing said cement, washed 30 to 70 mesh sand, Bentonite, and polymer in accordance with the ratio of one part cement to two to four parts washed 30 to 70 mesh sand to one eighth to one half part Bentonite to one sixth to two thirds part polymer.

16. The simulated rock piece of claim 15 wherein said process comprises the further step of troweling said finish coat to form a smooth finish.

17. The simulated rock piece of claim 16 wherein said process comprises the further steps of:

applying a stencil having ornamentation or lettering to the setting finish coat;

applying an additional base coat or color coat to the simulated rock; and removing said stencil, leaving a recessed letter or design in said structure.

18. The simulated rock piece of claim 15 wherein said step of mixing a settable cement finish coat formulation further comprises mixing said cement, washed 30 to 70 mesh sand, Bentonite, and polymer in accordance with the ratio of one part cement to three parts washed 30 to 70 mesh sand to one quarter part Bentonite to one third part Bentonite.

19. The simulated rock of claim 11 wherein said process further comprises the steps of:

providing said mold with an implement which after said simulated rock is produced will provide said simulated rock with a through hole.

20. The simulated rock of claim 11 wherein said process further comprises the step of:

providing said mold with a fixed attachment implement which when said simulated rock is produced will provide said simulated rock with an implanted fixed attachment point.

* * * * *